US008965364B2

(12) United States Patent
Karaoguz et al.

(10) Patent No.: US 8,965,364 B2
(45) Date of Patent: *Feb. 24, 2015

(54) SERVICE MOBILITY VIA A FEMTOCELL INFRASTRUCTURE

(71) Applicant: Broadcom Corporation, Irvine, CA (US)

(72) Inventors: Jeyhan Karaoguz, Irvine, CA (US); Charles Abraham, Los Gatos, CA (US); Xuemin (Sherman) Chen, Rancho Santa Fe, CA (US); Wael William Diab, San Francisco, CA (US); Vinko Erceg, Cardiff, CA (US); Victor T. Hou, La Jolla, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/947,885

(22) Filed: Jul. 22, 2013

(65) Prior Publication Data
US 2013/0310005 A1 Nov. 21, 2013

Related U.S. Application Data

(63) Continuation of application No. 12/372,648, filed on Feb. 17, 2009.

(51) Int. Cl.
*H04W 4/00* (2009.01)
*H04W 8/18* (2009.01)
(Continued)

(52) U.S. Cl.
CPC ............... *H04W 8/18* (2013.01); *H04L 63/102* (2013.01); *H04W 12/08* (2013.01); *H04W 48/02* (2013.01); *H04W 12/06* (2013.01); *H04W 84/045* (2013.01)
USPC ..... 455/432.3; 455/411; 455/410; 455/414.1; 455/3.05

(58) Field of Classification Search
CPC ... H04W 84/045; H04W 88/00; H04W 8/005; H04W 12/06; H04W 12/08
USPC ............ 455/410, 411, 414.1, 3.01, 3.05, 436, 455/440, 445, 552.1, 552.2, 553.1, 432.3; 370/331, 332, 241.1, 230.1, 469; 709/222, 227, 224
See application file for complete search history.

(56) References Cited

U.S. PATENT DOCUMENTS

| 8,150,387 B2 * | 4/2012 | Klein et al. .................... 455/420 |
| 8,269,892 B2 * | 9/2012 | Asada et al. .................. 348/554 |

(Continued)

FOREIGN PATENT DOCUMENTS

| CN | 1859559 A | 11/2006 |
| WO | WO2005021022 | 3/2005 |

(Continued)

OTHER PUBLICATIONS

Hyojin Park, FG IPTV-DOC-0059, Focus Group on IPTV, International Telecommunication Union, Telecommunication Standardization Sector, Study Period 2005-2006, 2nd FG IPTV Meeting, Busan, Oct. 16-20, 2006, pp. 1-45.

(Continued)

*Primary Examiner* — Jean Gelin
(74) *Attorney, Agent, or Firm* — Sterne, Kessler, Goldstein & Fox P.L.L.C.

(57) ABSTRACT

Aspects of a method and system for service mobility via a femtocell infrastructure are provided. In this regard, a mobile cellular enabled communication device may detect a femtocell operable to deliver content for one or more services to the mobile cellular enabled communication device, where the one or more services may be provided via a set-top-box communicatively coupled to the femtocell. The mobile cellular enabled communication device may communicate a user profile to the femtocell, wherein information in the profile may be utilized by the set-top-box to authenticate and/or authorize access to the services by the mobile cellular enabled communication device and thus the mobile cellular enabled communication device may receive the content from the set-top-box based on the authentication and/or authorization. The content may comprise voice, video, data, text and/or still images. The mobile cellular enabled communication device may detect the femtocell by receiving one or broadcast messages from the femtocell.

23 Claims, 6 Drawing Sheets

(51) Int. Cl.
*H04L 29/06* (2006.01)
*H04W 12/08* (2009.01)
*H04W 48/02* (2009.01)
*H04W 12/06* (2009.01)
*H04W 84/04* (2009.01)

(56) References Cited

U.S. PATENT DOCUMENTS

| | | | |
|---|---|---|---|
| 8,346,267 | B2 | 1/2013 | Chen et al. |
| 8,522,271 | B2 * | 8/2013 | Childress et al. ............ 725/34 |
| 2002/0049061 | A1 | 4/2002 | Pinola |
| 2006/0209795 | A1 | 9/2006 | Chow et al. |
| 2007/0121655 | A1 | 5/2007 | Jin |
| 2008/0034095 | A1 | 2/2008 | Richardson et al. |
| 2008/0116145 | A1 | 5/2008 | Johnson et al. |
| 2008/0159232 | A1 | 7/2008 | Thalanany et al. |
| 2008/0216145 | A1 | 9/2008 | Barton et al. |
| 2008/0244148 | A1 | 10/2008 | Nix et al. |
| 2008/0305801 | A1 | 12/2008 | Burgess et al. |
| 2009/0042536 | A1 | 2/2009 | Bernard et al. |
| 2009/0061873 | A1 | 3/2009 | Bao et al. |
| 2009/0092081 | A1 | 4/2009 | Balasubramanian et al. |
| 2009/0098858 | A1 | 4/2009 | Gogic |
| 2009/0164547 | A1 | 6/2009 | Ch'ng et al. |
| 2009/0279430 | A1 | 11/2009 | Huber et al. |
| 2009/0279519 | A1 | 11/2009 | Brisebois et al. |
| 2009/0280779 | A1 | 11/2009 | Torres et al. |
| 2009/0288144 | A1 | 11/2009 | Huber et al. |
| 2009/0292799 | A1 | 11/2009 | Eisener et al. |
| 2009/0312017 | A1 | 12/2009 | Grob et al. |
| 2009/0316649 | A1 | 12/2009 | Chen |
| 2010/0159895 | A1 | 6/2010 | Wallis et al. |
| 2010/0167734 | A1 | 7/2010 | Jones et al. |
| 2010/0182991 | A1 | 7/2010 | Abraham et al. |
| 2010/0184411 | A1 | 7/2010 | Chen et al. |
| 2010/0184414 | A1 | 7/2010 | Abraham et al. |
| 2010/0184423 | A1 | 7/2010 | Kent et al. |
| 2010/0184441 | A1 | 7/2010 | Breuer et al. |
| 2010/0184450 | A1 | 7/2010 | Chen et al. |
| 2010/0186027 | A1 | 7/2010 | Hou et al. |
| 2010/0210239 | A1 | 8/2010 | Karaoguz et al. |
| 2010/0215029 | A1 | 8/2010 | Karaoguz et al. |
| 2010/0220642 | A1 | 9/2010 | Abraham et al. |
| 2010/0220692 | A1 | 9/2010 | Diab et al. |
| 2010/0220731 | A1 | 9/2010 | Diab et al. |
| 2010/0222054 | A1 | 9/2010 | Abraham et al. |
| 2010/0222069 | A1 | 9/2010 | Abraham et al. |
| 2010/0238836 | A1 | 9/2010 | Diab et al. |
| 2013/0125163 | A1 | 5/2013 | Chen et al. |

FOREIGN PATENT DOCUMENTS

| | | |
|---|---|---|
| WO | WO2007/000455 | 1/2007 |
| WO | WO 2007/000455 A1 | 1/2007 |

OTHER PUBLICATIONS

Unpublished U.S. Appl. No. 12/391,009, filed Feb. 23, 2009.
Unpublished U.S. Appl. No. 12/406,835, filed Mar. 18, 2009.
Unpublished U.S. Appl. No. 12/395,410, filed Feb. 27, 2009.
Unpublished U.S. Appl. No. 12/395,383, filed Feb. 27, 2009.
Unpublished U.S. Appl. No. 12/395,313, filed Feb. 27, 2009.
Unpublished U.S. Appl. No. 12/395,436, filed Feb. 27, 2009.
Unpublished U.S. Appl. No. 12/395,470, filed Feb. 27, 2009.
Office Action dated Mar. 1, 2011 in U.S. Appl. No. 12/372,648.
Office Action dated Mar. 22, 2013 in U.S. Appl. No. 12/372,648.
English-Language Abstract for Chinese Patent Publication No. CN 1859559 A, published Nov. 8, 2006, 2 pages.
Chinese Office Action directed to related Chinese Patent Application No. 201010127158.7, mailed Mar. 29, 2013; 6 pages.
"Hyojin Park, FG IPTV-DOC-0059, Focus Group on IPTV, International Telecommunication Union, Telecommunication Standardization Sector, Study Period 2005-2008, 2nd FG IPTV Meeting, Busan, Oct. 16-20, 2006, pp. 1-45."
European Search Report corresponding to European Patent Application No. 10001341.6-1244, dated Jul. 5, 2010.

* cited by examiner

SERVICE MOBILITY VIA A FEMTOCELL INFRASTRUCTURE

CROSS-REFERENCE TO RELATED APPLICATIONS/INCORPORATION BY REFERENCE

This is a continuation of U.S. patent application Ser. No. 12/372,648, filed Feb. 17, 2009, the disclosure of which is incorporated herewith in its entirety.

FIELD OF THE INVENTION

Certain embodiments of the invention relate to communications. More specifically, certain embodiments of the invention relate to a method and system for service mobility via a femtocell infrastructure.

BACKGROUND OF THE INVENTION

A femtocell may be placed in a customer's residence or in a small business environment, for example. Femtocells may be utilized for off-loading macro radio network facilities, improving coverage locally in a cost-effective manner, and/or implementing home-zone services to increase revenue. Femtocells, like macro base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data, for example.

An important characteristic of femtocells is their ability to control access. In an open access scenario, any terminal and/or subscriber may be allowed to communicate with the femtocell. Accordingly, the femtocell usage may somewhat resemble that of a macrocellular system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocellular base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA, for example, because initial operator deployments may use the same frequency for both the femtocell and the macrocellular networks or due to the proximity of femtocell base stations in dense urban areas.

There are a plurality of design models for deployment and integration of femtocells, for example, an IP based Iu-b interface, a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for service mobility via a femtocell infrastructure, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for service mobility via a femtocell infrastructure. In various embodiments of the invention, a mobile cellular enabled communication device may detect a femtocell that is operable to deliver content for one or more services to the mobile cellular enabled communication device, where the one or more services may be provided via a set-top-box communicatively coupled to the femtocell. The mobile cellular enabled communication device may communicate a user profile to the femtocell, where information in the profile may be utilized by the set-top-box to authenticate and/or authorize access to the services by the mobile cellular enabled communication device. Thus the mobile cellular enabled communication device may receive the content from the set-top-box based on the authentication and/or authorization. The content may comprise voice, video, data, text and/or still images. The mobile cellular enabled communication device may receive broadcast messages from the femtocell. The broadcast messages may be utilized by the mobile cellular enabled communication device to detect the femtocell. The user profile may be communicated from the mobile cellular enabled communication device to the set-top-box via an in-band or out-of-band communication channel. The content may be decrypted based on information in the user profile. The mobile cellular enabled communication device may consume the content received from the set-top-box via the femtocell. The user profile may comprise one or more of an identity of the mobile cellular enabled communication device, capabilities of the mobile cellular enabled communication device, preferred content, desirable content, active subscriptions, parental settings, and security information. The set-top-box may format the content based on information in the user profile.

Figure 1A:
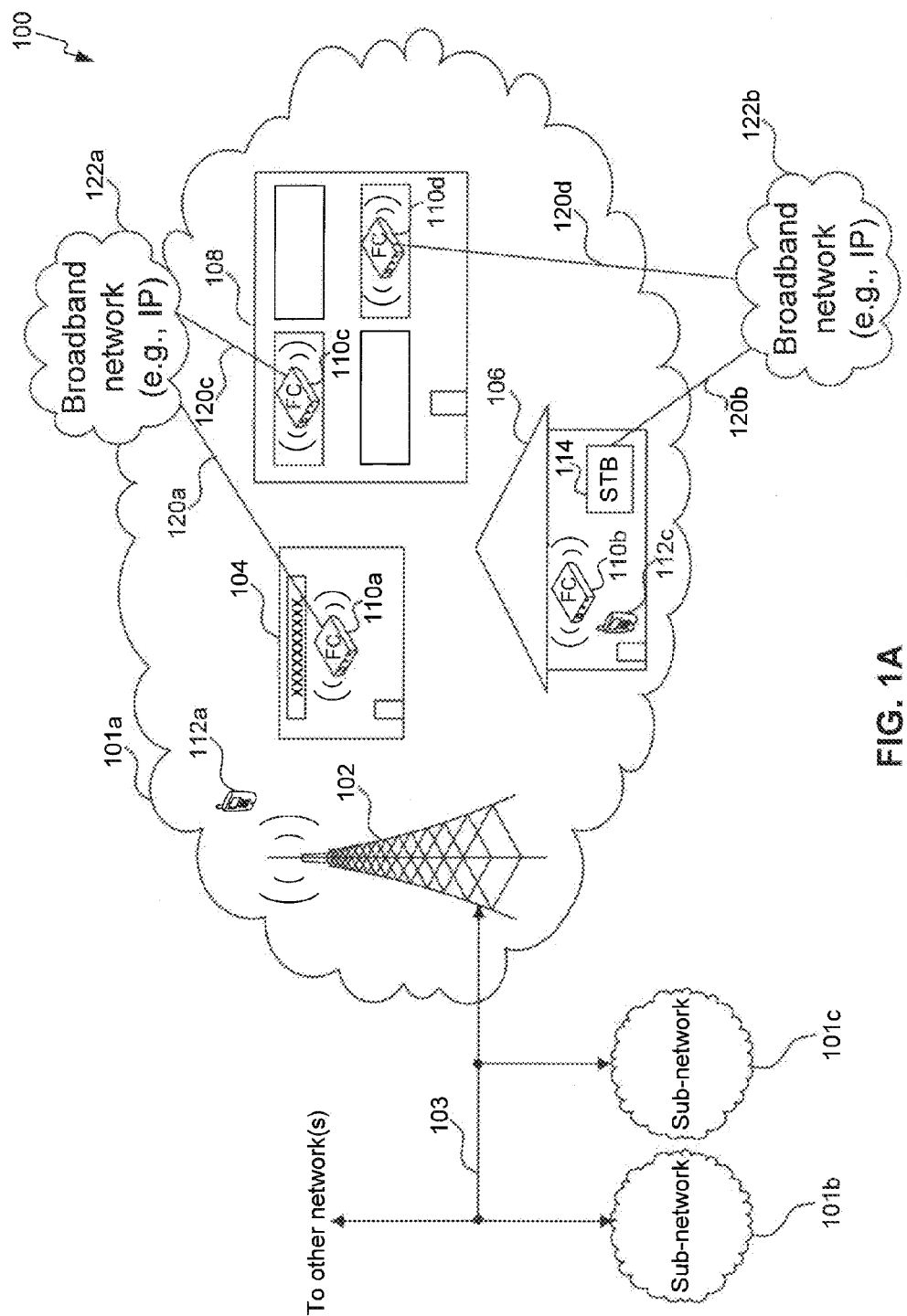
FIG. 1A is a diagram illustrating an exemplary cellular network, in accordance with an embodiment of the invention.

FIG. 1A is a diagram illustrating an exemplary cellular network, in accordance with an embodiment of the invention. Referring to FIG. 1A, there is shown a cellular network 100 comprising sub-networks 101a-101c. The exemplary sub-network 101a may comprise a base station 102, femtocells 110a-110d, which are collectively referred to herein as femtocells 110, a set-top-box 114, and mobile cellular enabled communication devices 112a and 112c, which are collectively referred to herein as mobile cellular enabled communication devices 112. The femtocells 110 may be installed in one or more commercial properties 104, one or more residential properties 106, and/or one or more multi-tenant properties 108.

The networks 122a and 122b, collectively referred to herein as networks 122, may comprise, for example, satellite networks, cable networks, DVB networks, the Internet, or similar local or wide area networks, which are capable of conveying data which may comprise multimedia. The broadband connections 120a-120d, collectively referred to herein as connections 120, may comprise optical, wired, and/or wireless links.

The commercial properties 104 may comprise, for example, stores, restaurants, offices, and municipal buildings. The residential properties 106 may comprise, for example, single-family homes, home offices, and/or town-houses. Multi-tenant properties 108 may comprise, for example, residential and/or commercial tenants such as apartments, condos, hotels, and/or high rises. One or more of the commercial properties 104, residential properties 106, and/or multi-tenant properties 108 may comprise computing and/or multimedia networks which may comprise an integrated femtocell and set-top-box (IFSTB) device.

The base station 102 may be operable to communicate data wirelessly utilizing one or more cellular standards such as IS-95, COMA, GSM, TDMA, GPRS, EDGE, UMTS/WCDMA, TO-SCDMA, HSDPA, extensions thereto, and/or variants thereof. "Data," as utilized herein, may refer to any analog and/or digital information including but not limited to voice, Internet data, and/or multimedia content. Multimedia content may comprise audio and/or visual content comprising, video, still images, animated images, and/or textual content. The base station 102 may communicate with mobile cellular enabled communication devices such as the mobile cellular enabled communication devices 112. Exemplary cellular standards supported by the base station 102 may be specified in the International Mobile Telecomunnications-2000 (IMT-2000) standard and/or developed by the 3rd generation partnership project (3GPP) and/or the $3^{rd}$ generation partnership project 2 (3GPP2). The base station 102 may communicate data amongst the various components of the sub-network 101a. Additionally, data communicated to and/or from the base station 102 may be communicated to sub-network 101b, sub-network 101c, and/or to one or more other networks (not shown) via one or more backhaul links 103. In this manner, data communicated to and/or from the base station 102 may be communicated to and/or from, other portions of the network 100 and/or other networks. Exemplary networks with which data may be communicated may comprise public switched telephone networks (PSTN) and/or IP networks such as the Internet or an intranet.

The femtocells 110 may each comprise suitable logic, circuitry, and/or code that may be operable to communicate wirelessly utilizing one or more cellular standards such as IS-95, CDMA, GSM, TDMA, GPRS, EDGE, UMTS/WCDMA, TD-SCDMA, HSDPA, extensions thereto, and/or variants thereof. In this regard, the femtocells 110 may each communicate with mobile cellular enabled communication devices such as the mobile cellular enabled communication devices 112. Exemplary cellular standards supported by the femtocells 110 may be specified in the International Mobile Telecomunnications-2000 (IMT-2000) standard and/or developed by the $3^{rd}$ generation partnership project (3GPP) and/or the $3^{rd}$ generation partnership project 2 (3GPP2). The femtocells 110 may each comprise suitable logic, circuitry, and/or code that may be operable to communicate over a broadband and/or IP based network.

The set-top-box 114 may comprise suitable logic, circuitry, and/or code that may be operable to receive, process, and output content for one or more services, such as cable television, satellite television, on Internet access. The set-top-box 114 may be communicatively coupled to a femtocell via, for example, a USB or IEEE 1394 link. In various embodiments of the invention, the set-top-box functionality and the femtocell functionality may be integrated into a signal device, in this regard, the integrated device may share components comprising RF transmit and/or receive components, baseband processing function, clock and/or timing generation and/or processing functions, and/or management and/or control functions. The set-top-box may be communicatively coupled to one or more multimedia devices such as a display and speakers via, for example, a HDMI link.

In various embodiments of the invention, the set-top-box functionality may be integrated into the one or more of the femtocells 110, or the femtocells 110, or equivalent functionality, may be integrated into a set-top-box, such as the set-top-box 114. In some embodiments of the invention, a femtocell, or equivalent functionality, and a set-top-box, or equivalent functionality, may be integrated into a single device. In some embodiments of the invention, a femtocell and a set-top-box may reside in physically separate devices that may be communicatively coupled via a wired or wireless connection such as USB, IEEE 1394, HDMI, Ethernet, Bluetooth, or Wi-Fi.

Regardless of the manner in which a femtocell and set-top-box are integrated and/or communicatively coupled, various embodiments of the invention are operable to enable cellular communication between a femtocell and a mobile cellular communication device to access and utilize subscription based content and/or services via the set-top-box.

The mobile cellular enabled communication devices 112 may each comprise suitable logic, circuitry, and/or code that may be operable to communicate utilizing one or more cellular standards. In this regard, the mobile cellular enabled communication devices 112 may each be operable to transmit and/or receive data via the cellular network 100. Exemplary mobile cellular enabled communication devices may comprise laptop computers, mobile phones, and personal media players. The mobile cellular enabled communication devices 112 may be enabled to consume multimedia content and may additionally be enabled run a web browser or other applications for providing Internet services to a user of one of the mobile cellular enabled communication devices 112.

In operation, subscription based content for subscription based services may be communicated to, for example, mobile cellular enabled communication device 112c and/or one or more other multimedia and/or computing devices (not shown in FIG. 1A) based on a user profile communicated from the mobile cellular enabled communication device 112c to the femtocell 110b. The user profile may be utilized to authenticate the mobile cellular enabled communication device 112c or its user and may be utilized to determine content or services which may be accessible by the mobile cellular enabled communication device. In one exemplary embodiment of the invention, a user profile associated with the mobile cellular enabled communication device 112c may be communicated to the femtocell 110b via a cellular link. In this regard, the user profile may be communicated in-band with content that the user profile enables accessing. In another exemplary embodiment of the invention, a user profile associated with the mobile cellular enabled communication device 112c may be communicated to the femtocell 110b via, for example, a Bluetooth or USB link. In this regard, the user profile may be communicated out-of-band with content that the user profile enables accessing.

After receiving a user profile from the mobile cellular enabled communication device 112c, the femtocell 110b or femtocell functionality may communicate the received user profile to the set-top-box 114 or other device having set-top box functionality. In some embodiments of the invention, the user profile may be communicated to the set-top-box in-band with content being communicated from the set-top-box to the femtocell 110b. In some embodiments of the invention, the user profile may be communicated to the set-top-box out-of-band with content being communicated from the set-top-box to the femtocell 110b.

Figure 2:
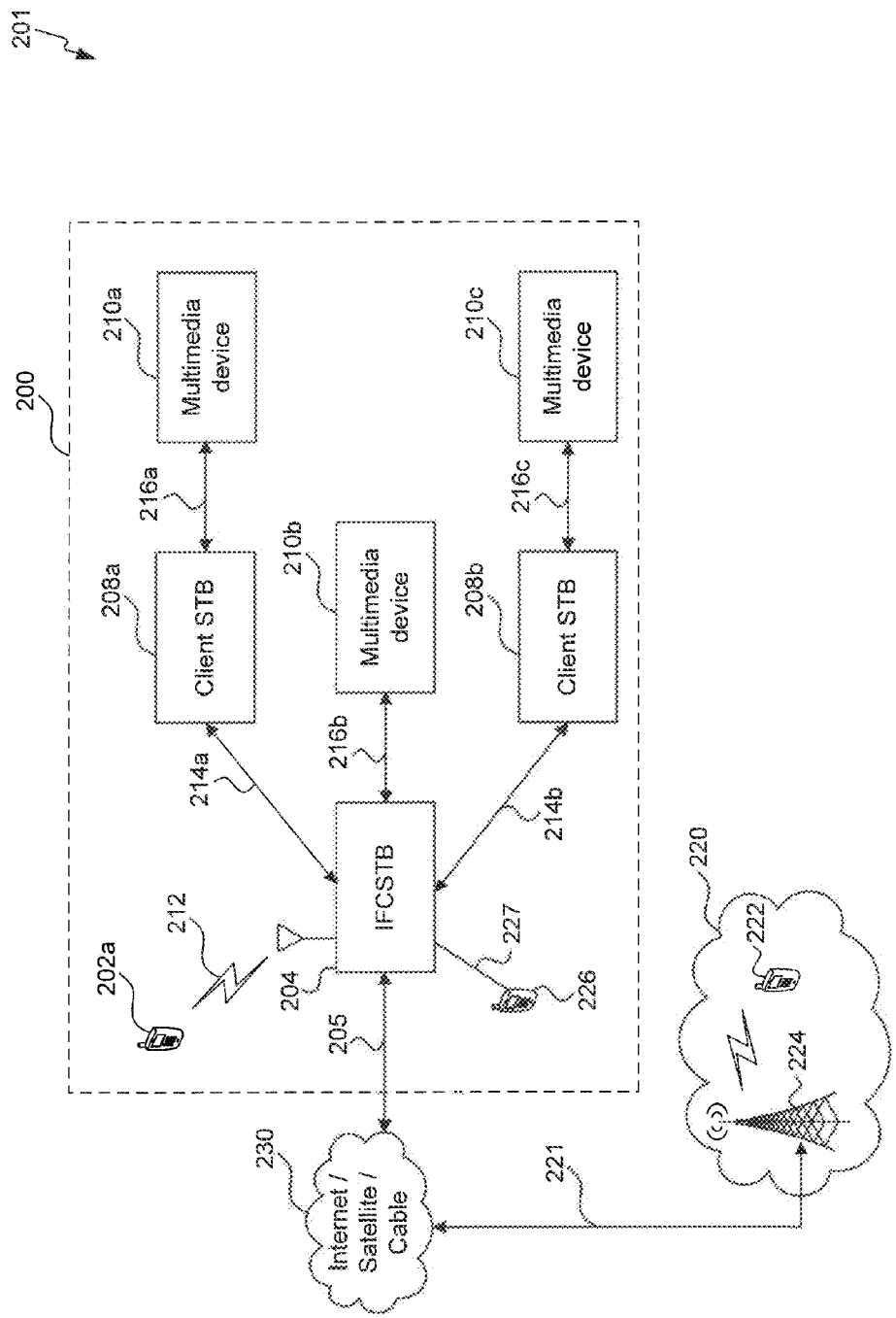
FIG. 2 is a diagram of a communication system comprising cellular network and a multimedia network comprising an integrated femtocell and set-top-box (IFSTB) device, in accordance with an embodiment of the invention.

The set-top-box 114, or other device having set-top box functionality, may utilize the user profile received from the femtocell 110b to access content for subscribed-to services. Additionally, the set-top-box may utilize the user profile received from the femtocell to determine how to process and/or format the received content and where and/or how to convey the content. In this regard, the set-top-box may convey the content to the femtocell 110b, which may in turn communicate the content or services to other femtocells, and/or the mobile cellular enabled communication device 112c. Alternatively and/or additionally, the set-top-box may communicate the content to other multimedia or network devices via one or more connections such as USB, HDMI, Ethernet, or Bluetooth, as shown in FIG. 2.

In various embodiments of the invention, because a user profile is associated with a mobile cellular enabled communication device, content for services to which the mobile cellular enabled communication device and/or its user are subscribed to may be accessed in any location where there is a compatible femtocell.

Figure 1B:
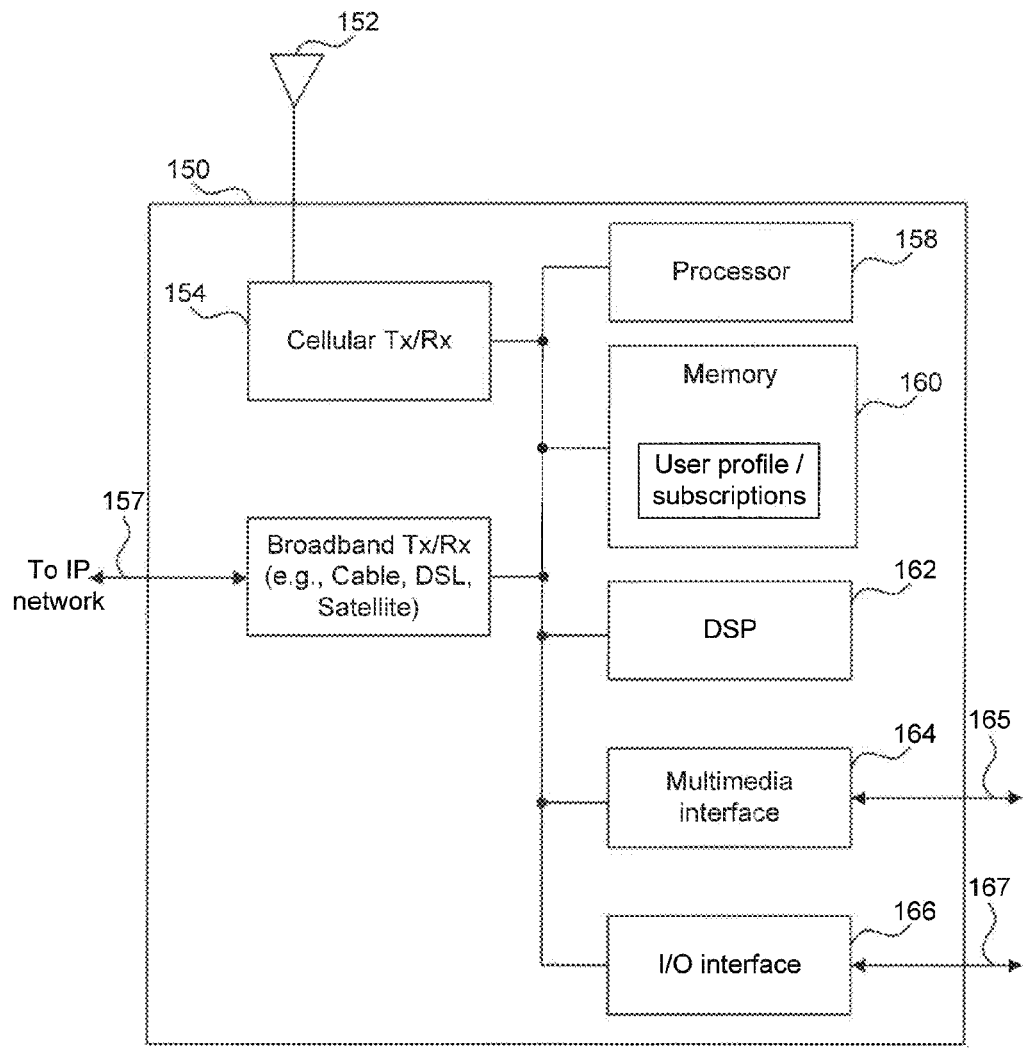
FIG. 1B is a diagram illustrating an exemplary block diagram of an integrated femtocell and set-top-box (IFSTB) device, in accordance with an embodiment of the invention.

FIG. 1B is a diagram illustrating an exemplary block diagram of an integrated femtocell and set-top-box (IFSTB) device, in accordance with an embodiment of the invention. Referring to FIG. 1B the IFSTB 150 may comprise an antenna 152, a cellular transmitter and/or receiver (Tx/Rx) 154, a broadband transmitter and/or receiver (Tx/Rx) 156, a processor 158, a memory 160, a digital signal processor (DSP) 162, an audio and/or video multimedia interface 164 and an input and/or output (I/O) interface 166.

The antenna 152 may be suitable for transmitting and/or receiving cellular signals. Although a single antenna is illustrated, the invention is not so limited. In this regard, the cellular Tx/Rx 154 may utilize a common antenna for transmission and reception, may utilize different antennas for transmission and reception, and/or may utilize a plurality of antennas for transmission and/or reception.

The cellular Tx/Rx 154 may comprise suitable logic circuitry and/or code that may be operable to transmit and/or receive data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform amplification, up-conversion, filtering, modulation, and digital to analog conversion of transmitted cellular signals. Exemplary cellular standards supported by the IFSTB 150 may be specified in the International Mobile Telecomunnications-2000 (IMT-2000) standard and/or developed by the $3^{rd}$ generation partnership project (3GPP) and/or the $3^{rd}$ generation partnership project 2 (3GPP2).

The broadband Tx/Rx 156 may comprise suitable logic, circuitry, and/or code that may be operable to transmit data in adherence to one or more broadband standards. The broadband Tx/Rx 156 may be operable to perform amplification, down-conversion, filtering, demodulation, and analog to digital conversion of received signals. The broadband Tx/Rx 156 may be operable to perform amplification, up-conversion, filtering, modulation, and digital to analog conversion of transmitted signals. The broadband Tx/Rx 156 may transmit and/or receive data over the broadband connection 157 which may comprise, for example, a T1/E1 line, optical fiber (e.g., xPON), DSL, cable television infrastructure, satellite broadband internet connection, satellite television infrastructure, and/or Ethernet.

The processor 158 may comprise suitable logic, circuitry, and/or code that may enable processing data and/or controlling operations of the IFSTB 150. In this regard, the processor 158 may be enabled to provide control signals to the various other blocks comprising the IFSTB 150. The processor 158 may also control transfers of data between various portions of the IFSTB 150. Additionally, the processor 158 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of the cellular Tx/Rx 154, the broadband Tx/Rx 156, the DSP 162, and/or the memory 160.

The memory 160 may comprise suitable logic, circuitry, and/or code that may enable storage or programming of information that includes parameters and/or code that may effectuate the operation of the IFS TB 150. The parameters may comprise configuration data and the code may comprise operational code such as software and/or firmware, but the information need not be limited in this regard. Moreover, the parameters may include adaptive filter and/or block coefficients.

The DSP 162 may comprise suitable logic, circuitry, and/or code operable to perform computationally intensive processing of data. In various embodiments of the invention, the DSP 162 may encode, decode, transcode, modulate, demodulate, encrypt, decrypt, scramble, descramble, and/or otherwise process data. In various embodiments of the invention, the DSP 162 may be enabled adjust a modulation scheme, error coding scheme, and/or data rates of transmitted cellular signals data.

The multimedia interface 164 may comprise suitable logic, circuitry, and/or code that may be operable to communicate multimedia content to one or more multimedia devices which may consume the multimedia content. In this regard, multimedia content received via one or more of the cellular Tx/Rx 154, the broadband Tx/Rx 156, and/or the I/O interface 166 may be output to one or more multimedia devices. The multimedia interface 164 may output analog and/or digital multimedia signals such as digital audio, analog audio, composite video, analog RGB video, S-Video, component video, DVI, HDMI, and/or DisplayPort. The multimedia interface 164 may be operable to up-convert, filter, modulate, and/or amplify multimedia signals. Accordingly, the multimedia connection(s) 165 may comprise optical, wired and/or wireless links suitable for conveying one or more of the multimedia standards supported by the multimedia interface 164.

The I/O interface 166 may comprise suitable logic, circuitry, and/or code that may be operable to exchange information in accordance with one or more communication standards. Exemplary communication standards supported by the I/O interface 166 may comprise USB, IEEE 1394, Wi-Fi, Wi-Max, infrared (IR), and/or Bluetooth. Accordingly, the I/O connection(s) 167 may comprise one or more optical, wired and/or wireless links suitable for conveying one or more of the communication standards supported by the I/O interface 166.

In operation, the IFSTB 150 may receive a user profile from a mobile cellular enabled communication device via the cellular Tx/Rx 154. The user profile may, for example, comprise information for decrypting subscription based content and/or services which may be received via the cellular Tx/Rx 154 and/or the broadband Tx/Rx 156. In an exemplary embodiment of the invention, encrypted content for subscription based services may be received via the broadband Tx/Rx 156, conveyed to the DSP 162, and the DSP 162 may decrypt the content and/or services utilizing the user profile information. Subsequently, the decrypted content may be conveyed to at least one of the mobile cellular enabled communication devices, which may be associated with the user profile via the cellular Tx/Rx 154. Additionally and/or alternatively, the decrypted content may be communicated to one or more multimedia devices via the multimedia interface 164. Additionally and/or alternatively, the decrypted content may be communicated to one or more other devices such as portable media players or computers via the I/O interface 166. In various embodiments of the invention, the IFSTB 150 may transcode the subscription based content and/or services between one or more of: formats suitable for transmission utilizing audio/video standards such as HDMI, DisplayPort, DVI, or raw audio/video; formats suitable for transmission over a broadband network such as an Ethernet network or a T1/E1 line; and formats suitable for transmission utilizing cellular standards such as IS-95, CDMA2000, GSM, UMTS, TO-SCDMA.

Figure 1C:
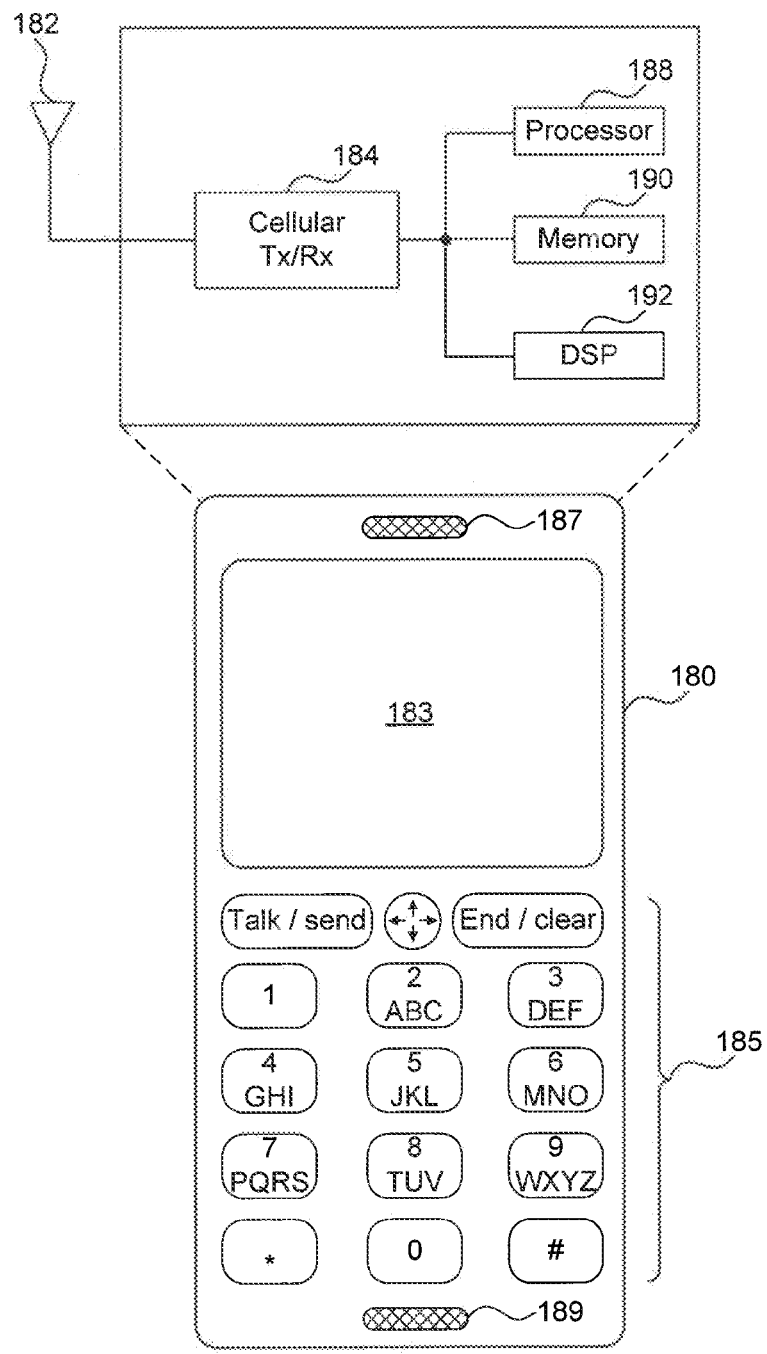
FIG. 1C illustrates an exemplary mobile cellular enabled communication device, in accordance with an embodiment of the invention.

FIG. 1C illustrates an exemplary mobile cellular enabled communication device, in accordance with an embodiment of the invention. Referring to FIG. 1C, the mobile cellular enabled communication device 180 may comprise an antenna 182, cellular Tx/Rx 184, a processor 188, a memory 190, a DSP 192, a display 183, user controls 185, a speaker 187, and a microphone 189.

The antenna 182 may be similar to the antenna 152 described with respect to FIG. 1B. The cellular Tx/Rx 184 may be similar to the cellular Tx/Rx 154 described with respect to FIG. 1B. The processor 188 may be similar to the processor 158 described with respect to FIG. 1B. The memory 190 may be similar to the memory 160 described with respect to FIG. 1B. The DSP 192 may be similar to the DSP 162 described with respect to FIG. 1B.

The display 183 may be operable to provide visual information to a user of the cellular enabled communication device 180. In various embodiments of the invention, a graphical user interface may be presented via the display 183. In various embodiments of the invention, a visual media content such as video, images, and text may be presented via the display 183.

The user controls 185 may be operable to enable user interaction with the user interface of the cellular enabled communication device 180 to control services and/or content handled by the cellular enabled communication device 180. The user controls 185 may comprise, for example, a keypad, a keyboard, a roller ball, a multidirectional button, a scroll wheels, and/or a touch screen.

The speaker 187 may be operable to present audio information to a user. The speaker may present voice from a phone call and/or music or ringtones played back by the cellular enabled communication device.

The microphone 189 may be operable to convert acoustic signals into electronic signals. The microphone may enable a user to participate in a phone call and/or interact with the cellular enabled communication device via oral input.

In operation, the mobile cellular enabled communication device 180 may be operable to detect femtocells that are operable to deliver content form one or more services to the mobile cellular enabled communication device 180. The mobile cellular enabled communication device 180 may communicate a profile associated with it to a set-top-box via a detected femtocell. The mobile cellular enabled communication device 180 may receive the content based on authentication and/or authorization information in the user profile. One or more user profiles associated with the cellular enabled communication device may be created, edited and/or otherwise managed via by interacting with user interface of the mobile cellular enabled communication devices 180 via the controls 185.

FIG. 2 is a diagram of a communication system comprising cellular network and a multimedia network comprising an integrated femtocell and set-top-box (IFSTB) device, in accordance with an embodiment of the invention. Referring to FIG. 2, the communication system 210 may comprise a multimedia network 200, a broadband network 230, and a cellular network 220.

The multimedia network 200 may comprise a mobile cellular enabled communication device 202, portable device 226, a IFSTB device 204, client set-top-boxes (STBs) 208a and 208b, which are collectively referred to herein as client STBs 208, and multimedia devices 210a, 210b, and 210c, which are collectively referred to herein as multimedia devices 210. The IFSTB device 204 may be communicatively coupled, via broadband connection 205, to a network 230, which may in turn be communicatively coupled, via backhaul connection 221, to a cellular network 220. The IFSTB device 204 may be communicatively coupled to one or more client set-top-boxes (STBs) 208 via multimedia connections 214 which may be similar to or the same as the multimedia connections 165 described with respect to FIG. 1B. The IFSTB device 204 may be communicatively coupled to one or more multimedia devices 210 via multimedia connections 216. The IFSTB device 204 may be communicatively coupled to one or more portable devices 226 via I/O connections 227 which may be similar to or the same as the I/O connection 167 described with respect to FIG. 1B.

The cellular network 220 may be similar to or the same as the cellular network 100 described with respect to FIG. 1A.

The portable device 226 may comprise, for example, a mobile cellular enabled communication device, a laptop computer, a personal data assistant, or a personal media player. The connection 227 to the portable device 226 may comprise, for example, an Ethernet, USB, or IEEE 1394 connection.

The broadband network 230 may comprise, for example, a satellite network, cable network, DVB network, the Internet or other IP based network, or similar local or wide area networks, which are capable of conveying data which may comprise multimedia.

The backhaul connection 221 may convey data between the cellular network 220 and the broadband network 230. In this regard, the backhaul connection 221 may comprise one or more wired and/or wireless backhaul links which communicatively couple the base station 224 to the broadband network 230.

The broadband connection 205 may comprise one or more high bandwidth connections that may be enabled to convey data. Exemplary broadband connections may comprise an Ethernet connection, a digital subscriber line (DSL), a T1/E1 line, a cable television infrastructure, a satellite television infrastructure, and/or a satellite broadband Internet connection. The broadband connection 205 may comprise one or more optical, wired and/or wireless links.

The mobile cellular enabled communication device 202 may be similar to or the same as the mobile cellular enabled communication devices 112 described with respect to FIG. 1A. In various embodiments of the invention, the mobile cellular enabled communication device 202 may store and/or be associated with a user profile. The user profile may comprise information such as active subscriptions, parental settings, and/or personal preferences. Also, the user profile may comprise security information such as certificates, passwords, and/or encryption keys. In this regard, permissions, features, and/or functionality of the mobile cellular enabled communication device 202 may be based on its user profile and security information associated with that user profile may enable accessing content for subscription based services. The user profile may be delivered to and/or configured on a mobile cellular enabled communication device, such as the devices 202 and 222, via cellular communications with, for example, a base station such as the base station 224.

In an exemplary embodiment of the invention, an electronic programming guide (EPG) may be customized and delivered to a mobile cellular enabled communication device based on a user profile associated with that mobile cellular enabled communication device. For example, channels, stations, and/or content in the EPG communicated to a mobile cellular enabled communication device may be customized to the subscriptions of that user profile.

The integrated femtocell and set-top-box (IFSTB) device 204 may comprise suitable logic, circuitry, and/or code that may be operable to receive data, transcode and/or otherwise process the received data, and transmit the data. The IFSTB 204 may be operable to transmit and/or receive data via cellular communication. The IFSTB 204 may be operable to transmit and/or receive data via the broadband connection 205. In some embodiments of the invention, IFSTB 204 may be operable to output multimedia content, extracted from received data, to one or more multimedia devices 210. In some embodiments of the invention, IFSTB 204 may be operable to forward received data to one or more client STBs 208.

In various embodiments of the invention, the permissions, features, and/or functionality of the IFSTB 204, and thus services (e.g., Internet access) and/or multimedia content available to the network 200, may be configurable and may be determined based on one or more user profiles communicated via a cellular link between from a mobile cellular enabled communication device to the IFSTB 204. Accordingly, a first set of services and/or multimedia content may be available to the network 200 for a first user profile and a second set of services and/or multimedia content may be available for a second user profile. The first user profile may be similar to or different from the second user profile. In some instances, multiple user profiles may be associated with a mobile cellular enabled communication device, and which profile is utilized may be determined based on information entered by a user of the mobile cellular enabled communication device. In other instances, a single user profile may be associated with multiple mobile cellular enabled communication devices. In some embodiments of the invention, valid user profiles may be persistent on the IFSTB 204 and may only need to be periodically updated via cellular communications with their corresponding mobile cellular enabled communication devices. In other embodiments of the invention, user profile may only be valid while an associated or particular mobile cellular enabled communication device is within cellular communication range of the IFSTB 204.

The client STBs 208 may each comprise suitable logic, circuitry, and/or code that may be operable to receive data, extract multimedia content from the received data, process the multimedia content, and output the multimedia content to one or more multimedia devices 210. In some embodiments of the invention, the permissions, features, and/or functionality of the client STBs 208 may be configurable. In this manner, multimedia content that may be consumed by the client STBs 208 may be determined based on a user profile associated with a mobile cellular enabled communication device in communication with the IFSTB 204. In some embodiments of the invention, the client STBs 208 may be physically the same as the IFSTB 204 but may be configured differently than the IFSTB 204 based, at least in part, on a user profile associated with a mobile cellular enabled communication device in communication with the IFSTB 204. In some embodiments of the invention, one or more of the client STBs may comprise a cellular transceiver or may be communicatively coupled to a mobile cellular enabled communication device. For example, the may be coupled via a USB or IEEE 1394 connection to a cellular phone or broadband access card.

The multimedia devices 210 may comprise, for example, televisions, displays, stereo systems, and/or recording and/or playback devices. The multimedia devices 210 may be enabled to receive audio and/or video content and present the content to a user.

In operation, the mobile cellular enabled communication device 202 may enter cellular communication range of the IFSTB 204. In some embodiments of the invention, the mobile cellular enabled communication device 202 may detect the IFSTB 204 by transmitting a page signal and listening for a response from any nearby femtocells and/or IFSTBs. The response from the IFSTB 204 may indicate content and/or services which the IFSTB 204 may be operable to provide. In some embodiments of the invention, the mobile cellular enabled communication device 202 may detect the IFSTB 204 by listening for a broadcast signal. Messages broadcast by the IFSTB 204 may indicate the content and/or services which the IFSTB 204 may be operable to provide.

After detecting the IFSTB 204, the mobile cellular enabled communication device 202 may communicate its user profile to the IFSTB 204 via cellular communications. In this manner, the user profile may be delivered to and/or verified by the network 200 via a communication channel that is out-of-band with the broadband connection 205. Accordingly, security of the content and/or services may be improved over conventional multimedia networks since the user profile may be delivered or handled separate from the content and/or services that the user profile controls.

Upon receipt and/or verification of the user profile by the IFSTB 204, the IFSTB 204 and/or the client STBs 208 may be configured based on the user profile. Content for subscription based services may be available to the client STBs 208, the multimedia devices 210, and/or the mobile cellular enabled communication device 202. In this regard, in some embodiments of the invention, the user profile may be communicated to a source of the subscription based services and the source may transmit content for subscribed-to services to the IFSTB 204 based on request from an authorized client. In other embodiments of the invention, a source of subscription based content and/or services encrypted by a source prior to transmission to the IFSTB 204. Accordingly, the user profile may comprise necessary security information for decrypting content for subscribed-to services.

In various embodiments of the invention, information in a user profile may be utilized to determine permissions and thus enable access to restricted content and/or services. Accordingly, because user profiles may be associated with mobile cellular enabled communication devices, services and/or content available in the network 200 may depend on mobile cellular enabled communication devices within cellular communication range of the IFSTB 204.

In some embodiments of the invention, the network 200 may be controlled remotely via data received over the broadband network 230. For example, a user of the mobile cellular enabled communication device 222 may request the IFSTB 204 to record subscribed-to content when the user is away from the network 200. In this regard, the cellular communication device 222 may send the request to the IFSTB 204 via the base station 224, the backhaul connection 221, the broadband network 230, and the broadband connection 205. In some embodiments of the invention, the recording may be performed because the mobile cellular enabled communication device 222 may have previously been in cellular communication range of the IFSTB 204 and a user profile associated with the mobile cellular enabled communication device 222 may still be valid. In other embodiments of the invention, the recording may be performed conditionally. For example, the IFSTB 204 or one of the client STBs 208 may record the show, but the show may not be viewable until the mobile cellular enabled communication device 222 comes within range of the IFSTB 204 and the pertinent user profile information may be validated.

Figure 3:
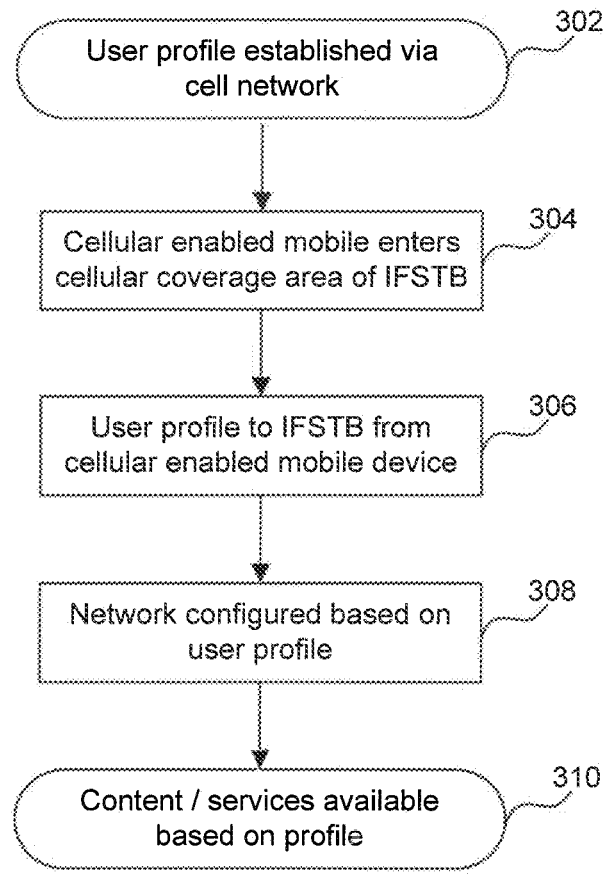
FIG. 3 is a flow chart illustrating exemplary steps for accessing subscription based content and/or services, in accordance with an embodiment of the invention.

FIG. 3 is a flow chart illustrating exemplary steps for accessing subscription based content and/or services, in accordance with an embodiment of the invention. Referring to FIG. 3, the exemplary steps may begin with step 302 when a user profile associated with a mobile cellular enabled communication device may be configured based on, subscriptions of a user of the mobile cellular enabled communication device. The user profile may be configured via cellular communications with a cellular network. In this manner, the user profile, including any related security information, may be configured out-of-band with any local area networks to which the user profile may apply. Subsequent to step 302, the exemplary steps may advance to step 304.

In step 304 a mobile cellular enabled communication device may enter a cellular coverage area of an IFSTB. The IFSTB may be part of a multimedia network which may provide subscription based services. Subsequent to step 304, the exemplary steps may advance to step 306.

In step 306, the user profile configured in step 302 may be communicated to and/or verified with the IFSTB utilizing cellular communications. In this regard, the user profile associated with the mobile cellular enabled communication device and/or its user may enable decrypting and/or otherwise accessing content for services that the mobile cellular enabled communication device or its user is subscribed to. Subsequent to step 306, the exemplary steps may advance to step 308.

In step 308, the IFSTB and/or other devices communicatively coupled to the IFSTB may be configured based on the user profile. For example, security keys may be set to enable decryption Of subscription based service and/or content. Subsequent to step 236, the exemplary steps may advance to step 310.

In step 310, the network, the IFSTB acting as a service and/or multimedia gateway may begin processing and distributing the content for the subscription based services. The content may be output to, for example, the mobile cellular enabled communication device, a computing device, and/or a multimedia device.

Figure 4:
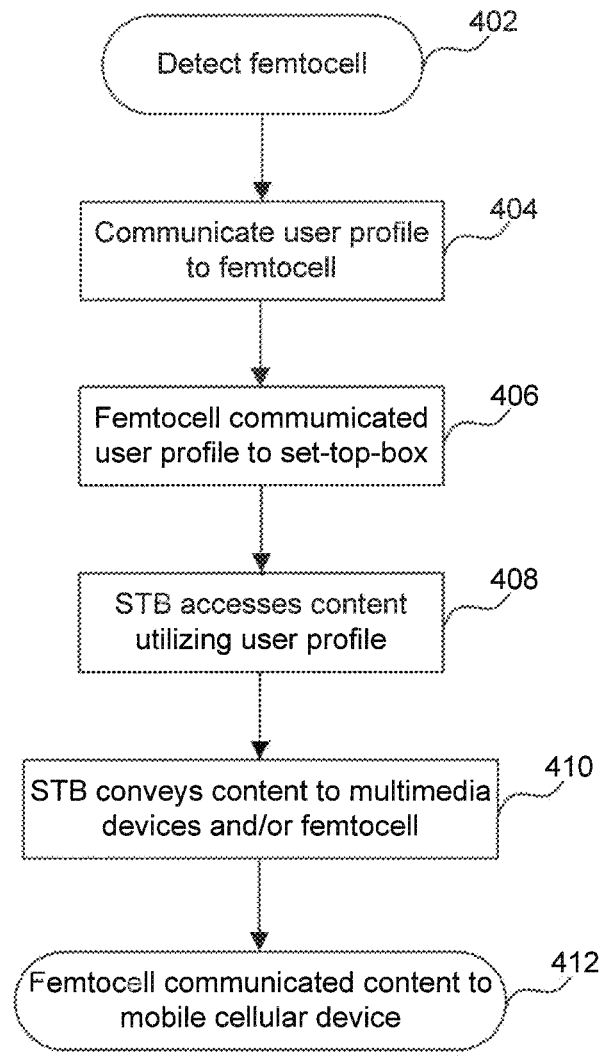
FIG. 4 is a flow chart illustrating exemplary steps for accessing content for subscription based services utilizing a femtocell, in accordance with an embodiment of the invention.

FIG. 4 is a flow chart illustrating exemplary steps for accessing content for subscription based services utilizing a femtocell, in accordance with an embodiment of the invention. Referring to FIG. 4, the exemplary steps may begin with step 402 when a mobile cellular enabled communication device 402 may detect a femtocell that may be communicatively coupled to a set-top-box. Subsequent to step 402, the exemplary steps may advance to step 404.

In step 404, the mobile cellular enabled communication device may communicate a user profile to the femtocell. In this regard, the user profile may be communicated in-band or out-of-band with other cellular communications between the mobile cellular enabled communication device. Out-of-band communications may be communications on other cellular frequencies or channels and/or via non-cellular wired or wireless links. Subsequent to step 404, the exemplary steps may advance to step 406.

In step 406, the femtocell may communicate the user profile received in step 404 to a set-top-box to which it is communicatively coupled. In some exemplary embodiments of the invention, the femtocell and set-top-box may be communicatively coupled via a multimedia link such as HDMI and/or an I/O link such as USB or IEEE 1394. In this regard, the user profile may be communicated at the same time and/or over a common link with content, i.e. it may be communicated in-band with the content. Alternatively, the user profile may be communicated at different times and/or over different links than the content, that is, it may be communicated out-of-band with the content. Subsequent to step 406, the exemplary steps may advance to step 408.

In step 408, the set-top-box may decrypt or otherwise enable access to content for subscription based services, where the decryption or access is enabled based on information in the user profile. In this manner, information in the user profile may authenticate the mobile cellular enabled communication device as being subscribed to one or more services. Subsequent to step 408, the exemplary steps may advance to step 410.

In step 410, the set-top-box may format or otherwise process the content and output the content. The set-top-box may output the content to the femtocell. Additionally, the set-top-box may output the content via one or more multimedia interfaces to multimedia equipment such as a display and/or speakers. Subsequent to step 410, the exemplary steps may advance to step 412.

In step 412, the femtocell may communicate the content to the mobile cellular enabled communication device.

Aspects of a method and system for service mobility via a femtocell infrastructure are provided. In an exemplary embodiment of the invention, a mobile cellular enabled communication device 112c may detect a femtocell 110b that is operable to deliver content for one or more services to the mobile cellular enabled communication device 112c, where the one or more services may be provided via a set-top-box 114, which may be communicatively coupled to the femtocell 110b. The mobile cellular enabled communication device 112c may communicate a user profile to the femtocell 110b, where information in the profile may be utilized by the set-top-box 114 to authenticate and/or authorize access to the services by the mobile cellular enabled communication device 112c. Thus, the mobile cellular enabled communication device 112c may receive the content from the set-top-box 114 based on the authentication and/or authorization. The content may comprise voice, video, data, text and/or still images. The mobile cellular enabled communication device 112c may receive broadcast messages from the femtocell. The broadcast messages may be utilized by the mobile cellular enabled communication device 112c to detect the femtocell 110b. The user profile may be communicated from the mobile cellular enabled communication device 112c to the set-top-box 114 via an in-band or out-of-band communication channel. The content may be decrypted based on information in the user profile. The mobile cellular enabled communication device may consume the content received from the set-top-box 114 via the femtocell 110b. The user profile may comprise one or more of: an identity of the mobile cellular enabled communication device 112c, capabilities of the mobile cellular enabled communication device 112c, preferred content, desirable content, active subscriptions, parental settings, and security information. The set-top-box 114 may format the content based on information in the user profile.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for service mobility via a femtocell infrastructure.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, comprising:
   receiving, by a femtocell, a profile associated with a cellular enabled communication device, the femtocell being communicatively coupled to a set-top box that is configured to provide a subscription-based multimedia service;
   communicating, by the femtocell, the profile associated with the cellular enabled communication device to the set-top box, wherein the profile includes authentication or authorization information that is utilized by the set-top box to authenticate or authorize access to the subscription-based multimedia service; and
   transmitting, by the femtocell, subscribed multimedia content associated with the subscription-based multimedia service from the set-top box to a multimedia device based on the authentication or authorization information.

2. The method according to claim 1, wherein the subscribed multimedia content comprises: voice, video, data, text or a still image.

3. The method according to claim 1, further comprising:
transmitting, by the femtocell, a broadcast message to the cellular enabled communication device.

4. The method according to claim 1, further comprising:
communicating the authentication or authorization information to a source of the subscription-based multimedia service.

5. The method according to claim 1, wherein the communicating comprises:
communicating the profile from the cellular enabled communication device to the set-top box via an in-band communication channel.

6. The method according to claim 1, wherein the communicating comprises:
communicating, the profile from the cellular enabled communication device to the set-top box via an out-of-band communication channel.

7. The method according to claim 1, further comprising:
encrypting the subscribed multimedia content, and
wherein the transmitting comprises:
transmitting the encrypted subscribed multimedia content to the multimedia device from the set-top box based on the authentication or authorization information.

8. The method according to claim 7, further comprising:
decrypting, at the multimedia device, encrypted subscribed multimedia content.

9. The method according to claim 8, further comprising:
utilizing the decrypted subscribed multimedia content by the multimedia device.

10. The method according to claim 1, wherein the profile further comprises: an identity of the cellular enabled communication device, preferred content, desirable content, an active subscription, a parental setting, or security information.

11. The method according to claim 1, further comprising:
formatting, at the set-top box, the subscribed multimedia content for the subscription-based multimedia service based on the information in the profile.

12. The method according to claim 1, further comprising:
transmitting the subscribed multimedia content associated with the subscription-based multimedia service to the cellular enabled communication device based on the authentication or authorization information.

13. A system for networking, comprising:
a circuit for use in a cellular enabled communication device, the circuit being configured to:
detect a femtocell communicatively coupled to a set-top box, the set-top box being configured to provide a subscription-based multimedia service;
communicate a profile associated with the cellular enabled communication device from the cellular enabled communication device to the set-top box via the detected femtocell, wherein the profile includes authentication or authorization information that is utilized by the set-top box to authenticate or authorize access to the subscription-based multimedia service; and
instruct the set top box to transmit subscribed multimedia content associated with the subscription-based multimedia service to a multimedia device based on the authentication or authorization information.

14. The system according to claim 13, wherein the subscribed multimedia content comprises: voice, video, data, text or a still image.

15. The system according to claim 13, wherein the circuit is further configured to receive a broadcast message from the femtocell.

16. The system according to claim 13, wherein the multimedia device comprises: a television, a stereo system, a recording device or a playback device, and wherein the television, the stereo system, the recording device or the playback device is configured to receive audio or video content from the set-top box.

17. The system according to claim 13, wherein the circuit is configured to communicate the profile from the cellular enabled communication device to the set-top box via an in-band communication channel.

18. The system according to claim 13, wherein the circuit is configured to communicate the profile from the cellular enabled communication device to the set-top box via an out-of-band communication channel.

19. The system according to claim 13, wherein the circuit is further configured to encrypt the subscribed multimedia content and to transmit the encrypted subscribed multimedia content.

20. The system according to claim 19, wherein the multimedia device is configured to decrypt the encrypted subscribed multimedia content that is received from the set-top box.

21. The system according to claim 20, wherein the multimedia device is configured to utilize the decrypted subscribed multimedia content received from the set-top box.

22. The system according to claim 13, wherein the profile further comprises: an identity of the cellular enabled communication device, preferred content, desirable content, an active subscription, a parental setting, or security information.

23. The system according to claim 13, wherein the set-top box is further configured to format the received subscribed multimedia content for the subscription-based multimedia service based on the information in the profile.

* * * * *

UNITED STATES PATENT AND TRADEMARK OFFICE
CERTIFICATE OF CORRECTION

| | | |
|---|---|---|
| PATENT NO. | : 8,965,364 B2 | Page 1 of 1 |
| APPLICATION NO. | : 13/947885 | |
| DATED | : February 24, 2015 | |
| INVENTOR(S) | : Karaoguz et al. | |

It is certified that error appears in the above-identified patent and that said Letters Patent is hereby corrected as shown below:

In the Claims

Column 15, line 29, please replace "device, encrypted" with --device, the encrypted--.

Signed and Sealed this
Sixteenth Day of June, 2015

Michelle K. Lee
*Director of the United States Patent and Trademark Office*